Figure 1:
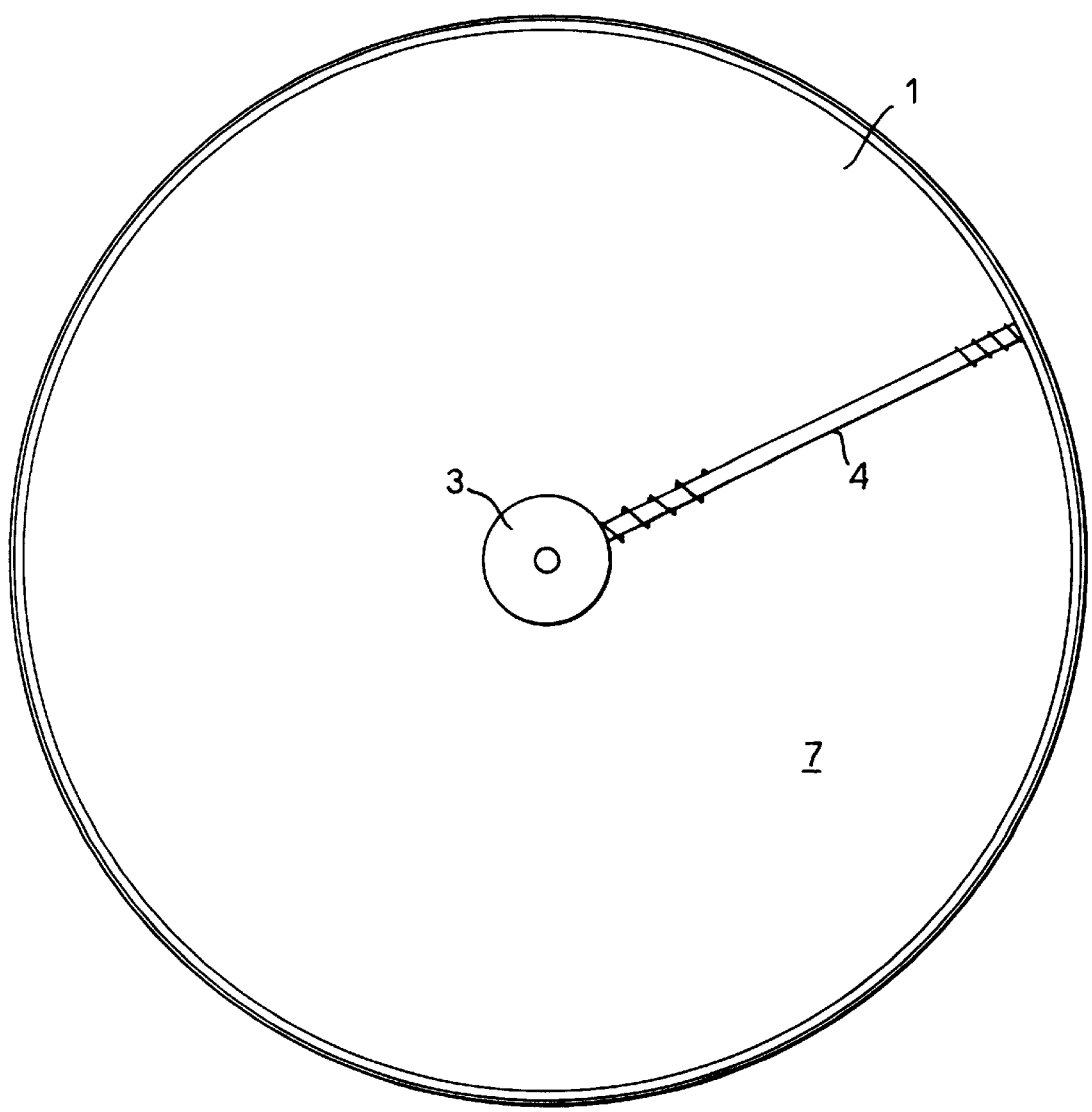

United States Patent

Jonkka

[11] Patent Number: 5,988,358
[45] Date of Patent: Nov. 23, 1999

[54] SCREW CONVEYOR

[75] Inventor: Arvo Jonkka, Pori, Finland

[73] Assignee: Sunds Defibrator Woodhandling Oy, Pori, Finland

[21] Appl. No.: 09/038,852

[22] Filed: Mar. 12, 1998

[30] Foreign Application Priority Data

Mar. 19, 1997 [FI] Finland .................................. 971154

[51] Int. Cl.$^6$ ............................................... B65G 33/32
[52] U.S. Cl. ........................... 198/672; 198/674; 414/322
[58] Field of Search ................................... 198/658, 672, 198/673, 674; 414/310–322

[56] References Cited

U.S. PATENT DOCUMENTS

| | | | |
|---|---|---|---|
| 2,674,898 | 4/1954 | Mudersbach . | |
| 3,254,777 | 6/1966 | Vandusen | 414/322 X |
| 4,256,453 | 3/1981 | Csapo | 198/672 X |

FOREIGN PATENT DOCUMENTS

| | | |
|---|---|---|
| 2572061 | 10/1984 | France . |
| 3827175 A1 | 3/1989 | Germany . |
| 1237161 | 6/1971 | United Kingdom . |
| 1375214 | 11/1974 | United Kingdom . |
| 2088318 | 6/1982 | United Kingdom . |

*Primary Examiner*—James R. Bidwell
*Attorney, Agent, or Firm*—Burns, Doane, Swecker & Mathis, L.L.P.

[57] ABSTRACT

A screw conveyor is provided with a drive in which cogged wheels are supported such that they are radially movable in relation to each other, parallel to a straight line perpendicular to a pressure line of tooth contact of the cogged wheels and parallel to surfaces of contact. The screw conveyor includes a frame adapted to turn around a vertical turning axis and a conveyor screw adapted to turn with the frame. A second one of the cogged wheels is supported such that it is movable vertically.

4 Claims, 6 Drawing Sheets

SCREW CONVEYOR

A screw discharger is a very commonly used chips discharging apparatus in the pulp and paper industry. A turning discharger screw discharging from under a heal) is used for the discharge of open heaps anid silos. Usually a turning discharger comprises a projecting screw mounted in two bearings at the drive end, spaced apart in the axial direction of the screw and receiving the suppolting forces. The bearings are fastened to the discharger frame in the pivoting centre. Furthermore, the frame is pivoted on the chip storage foundation so that it can turn in a horizontal plane. The maximum diameter of the discharging area of a turning projecting discharger screw is 25 meters which is also the maxinumn diameter of the round silo discharged by it. If a projecting discharger screw is desired to be longer, its thickness and the strength of the other constructional elements thereof need to be increased so much that the manufacturing costs become excessive, By supporting the screw also at its other end the length thereof can be increased without having to make it thicker. The length of a discharger screw supported at both ends can be increased with the result that the diameter of the discharging area becomes 36 meters without substantially increasing the thickness of the screw.

Although tile screw is supported at the periphery of the turning circle, it should preferably be supported against its frame, lying in the pivoting centre and turning with the screw, at two points spaced apart in the axial direction of the screw. If the screw is supported against the frame by one turning bearing, the torsional stress on this single tuning bearing of the screw, when the screw turns tie frame in the horizontal plane, becomes so great that the useful life of the bearing is substantially reduced. Besides, one bearing requires a very rigid base and, consequently, is expensive to bring into use.

The object of this invention is to achieve a gear drive allowing the drive end of a screw discharger to move vertically due to the bending of the screw, for example.

More specifically, the invention relates to the drive of a turning screw discharger, supported at both ends, and to the bearing arrangement at the drive end. Specific to the invention is that there is a horizontal connecting element placed between the screw and the turning frame, pivoted on the screw and turning the frame part, and allowing the screw end to move vertically, and that the cogged wheel driving the screw is displaced aside from the vertical position at a distance corresponding to the pressure angle (usually 20°) so that the pressure line is horizontal and the contacting surfaces almost vertical.

Figure 2:
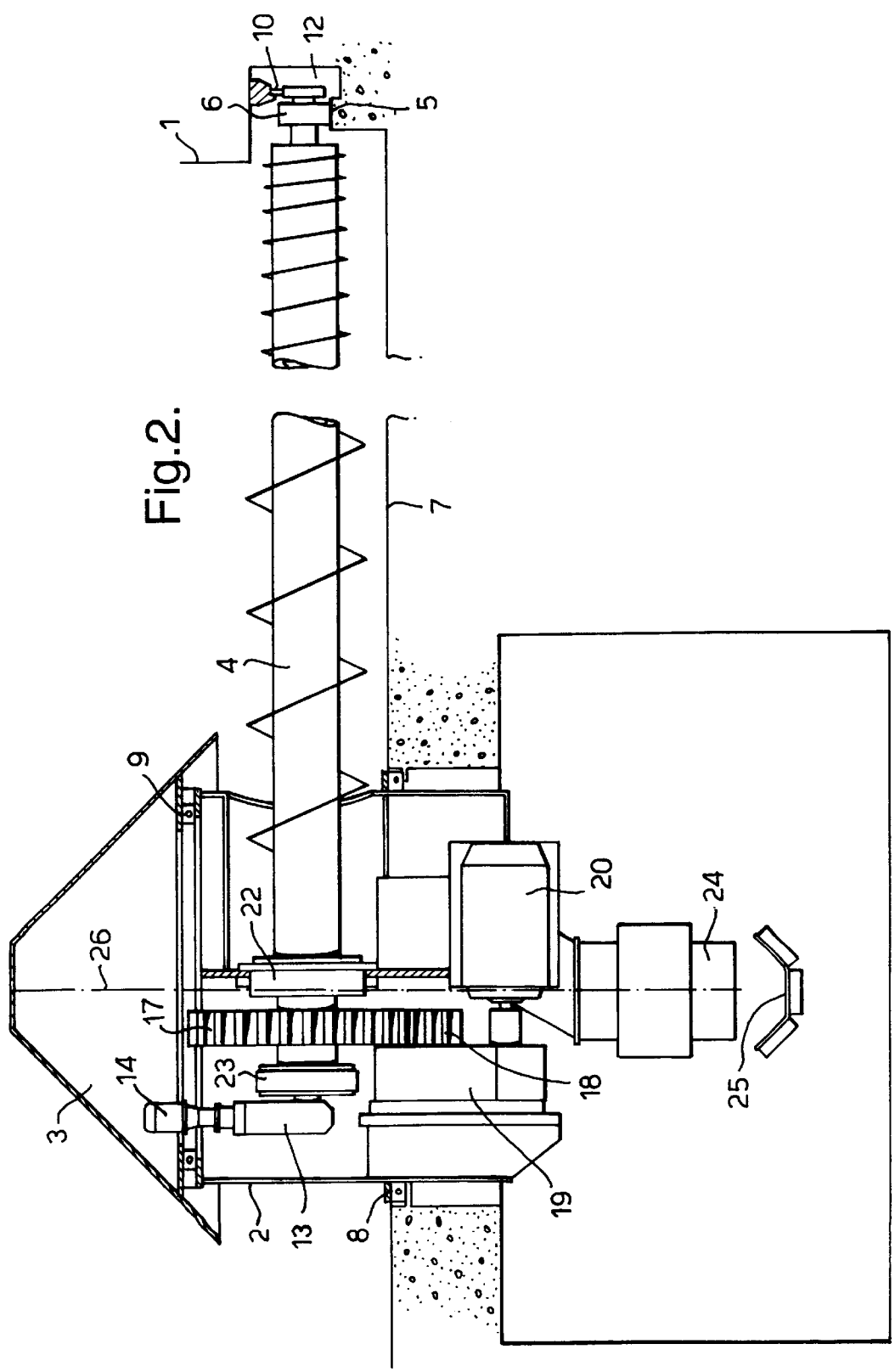
Figure 3:
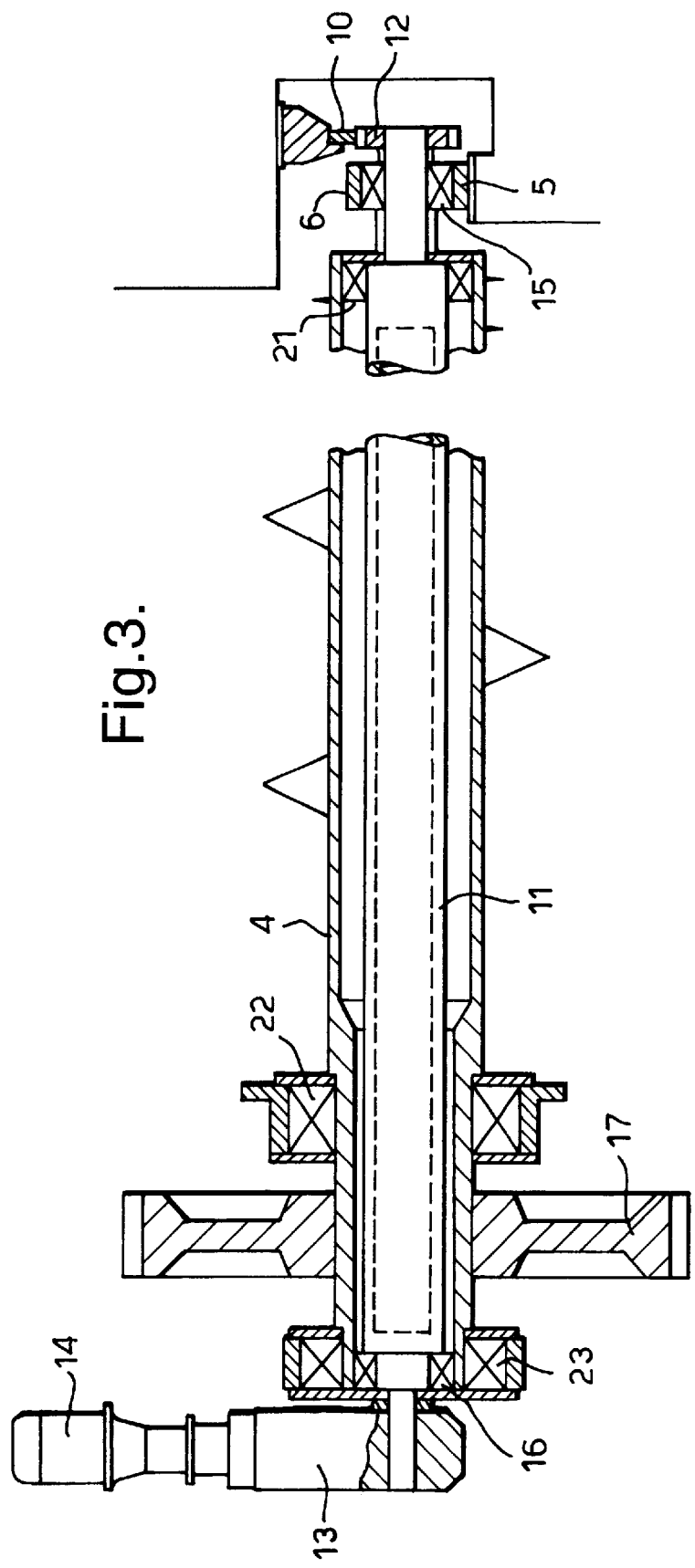
Figure 4:
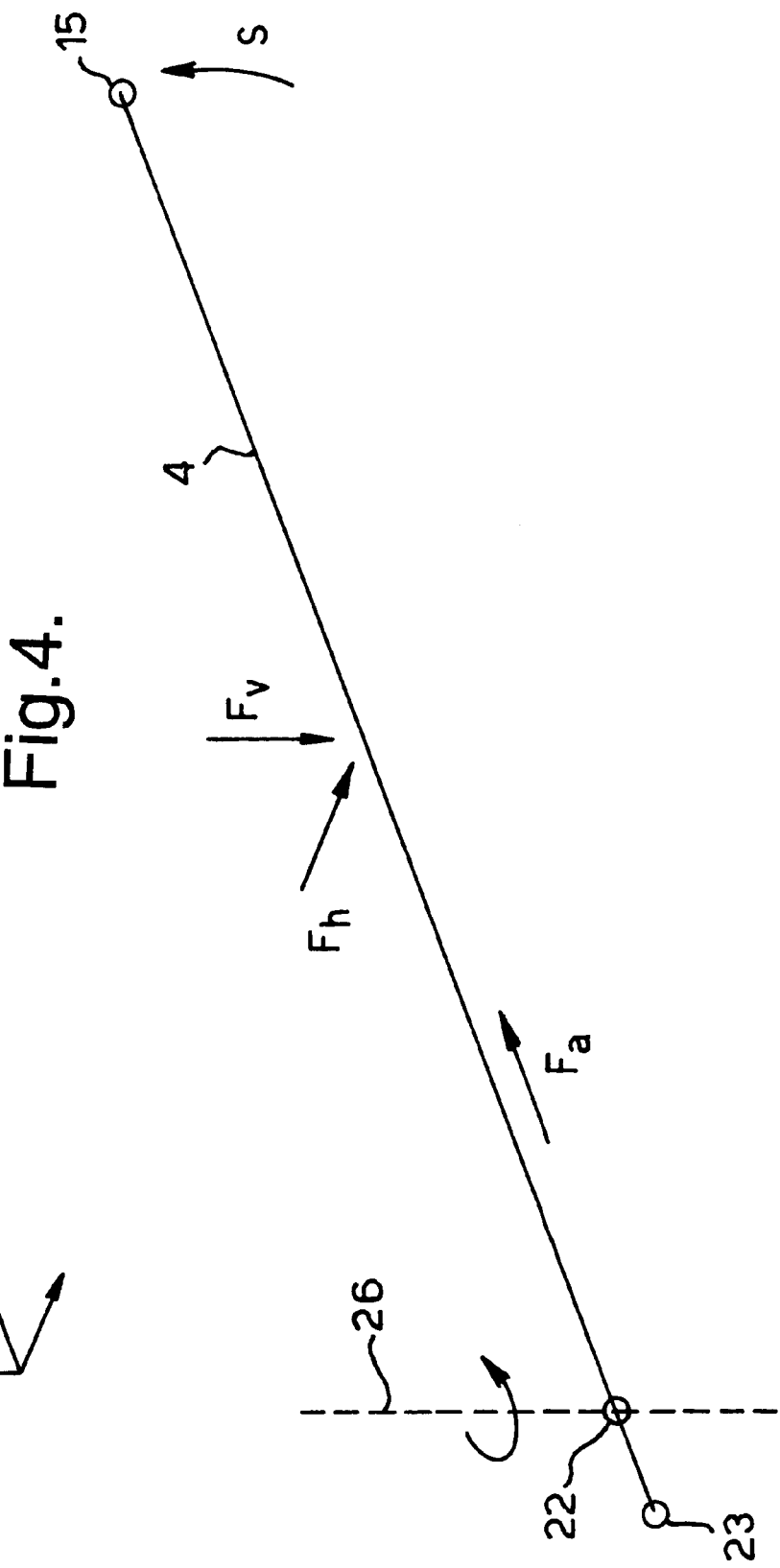
Figure 5:
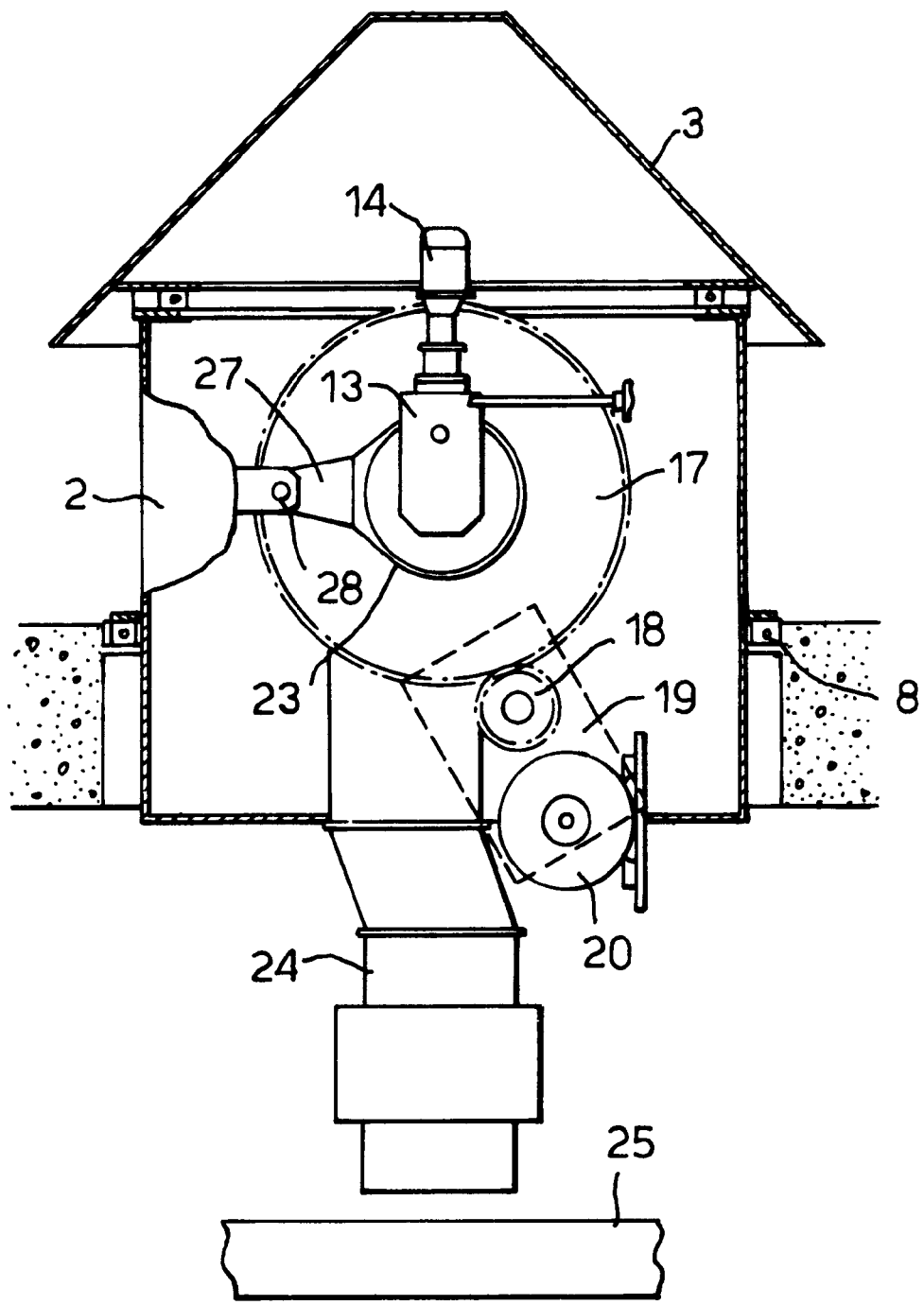
Figure 6:
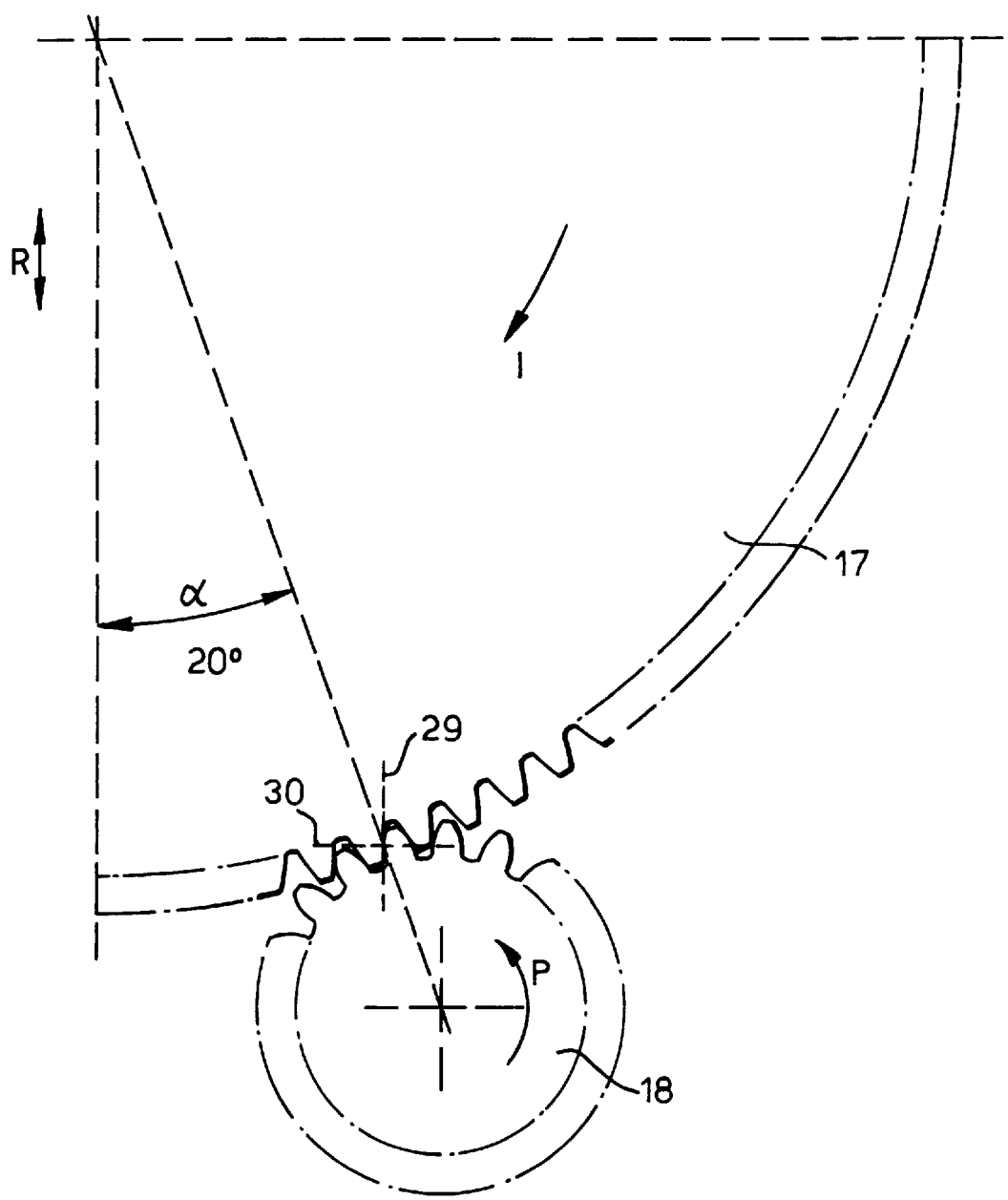

The invention and the details thereof mill be described in more detail in the following with reference to the accompanying drawings in which FIG. 1 shows a turning screw discharger, supported at both ends and located in a silo, seen from above, FIG. 2 is a side view of the discharger, frame 2, FIG. 3 is a side view of the bearing arrangements of the discharger screw, FIG. 4 is a three-dimensional view of the forces applied to the discharger screw from the material discharged, FIG. 5 shows the discharger frame in a plane perpendicular to the rotation axis of the screw, and FIG. 6 shows the position of the cogged wheels of the screw drive in relation to each other.

The turning discharger in the silo 1, shown in FIGS. 1 and 2, consists of a frame 2 turnable in a horizontal plane, of a protective cone 3 on the frame, of a discharger screw 4 pivoted on the frame and of drive and turning mechanisms. At the periphery of the silo the screw 4 is supported with a bearing on a supporting wheel 6 moving on a supporting track 5. The frame 2 is mounted in the main supporting bearing 8 at the bottom 7 of the silo. The protective cone 3 on the frame 2 pivots freely on a supporting bearing 9.

The turning mechanism is constituted by an annular cogged rail 10 at the silo periphery, by a turning cogged wheel 12, cooperating with the cogged rail and fastened to a turning shaft 11 (FIG. 3), by a pin-type gear 13 and by a torque motor 14. The turning shaft 11 is mounted in a bearing 15 of the supporting wheel 6 and in a bearing 16, at the silo periphery and at the drive end, respectively. When the motor 14 rotates the turning shaft 11 through the pin-type 13 gear, the cogged wheel 12 rolls along the cogged rail 10 and the whole apparatus turns around a vertical rotation axis 26, The drive of the screw 4 is constituted by a cogged wheel 17 fastened to the screw and by a smaller cogged wheel 18 rotating it, by a foot-type gear 19 fastened to the frame and by an electric motor 20 (FIG. 2). The screw 4 is carried in a bearing 21 located at the silo periphery, on the turning shaft 11, in a supporting and axial bearing 22 fastened to the frame 2 and in a bearing 23 supported horizontally against the frame 2 More detail, about the support arrangement of the bearing 23 against the frame will be given in connection with FIG. 5. The bearing 22 is a spherical roller bearing allowing the screw to bend and the "warpage" caused by manufacturing flaws.

The cogged wheels 17 and 18 are rotated by the motor 20 through the gear 19 and they transmit the movement to the screw 4. The screw 4 discharges chips to a conveyor 25 (FIG. 2), located beneath the discharger, with its spiral wing through a discharging hopper 24 included ill the discharger frame 2. Simultaneously, the discharger turns around its pivoting centre 26 in a horizontal plane clockwise or anti-clockwise.

The screw 4 is subjected to forces, coming from many directions, from the material being discharged. The forces are illustrated in a three-dimensional force diagram in FIG. 4. Furthermore, FIG. 4 shows the positions of the bearings of the screw 4.

The transport of the chips towards the centre 26 of the discharger causes an axial force $F_a$ to the screw 4. The frame 2 is subjected to the force $F_a$ through the screw 4 and through the bearing 22. The weight of the chips causes a vertical force $F_v$ to the screw and to the frame through the screw 4 and the bearing 22 and, at the silo periphery, to the supporting track 5 through the bearing 21, the turning shaft 11, the bearing 15 of the supporting wheel, and the supporting wheel 6. The screw 4 is subjected to a horizontal force $F_h$ (or $-F_h$ if the turning direction is opposite), parallel with the screw axis and caused by the chips, when the turning cogged wheel 12 turns the discharger around the pivoting centre 26 in direction S in the horizontal plane.

The screw 4 is supported on the frame by two bearings 22, 23 spaced apart so that the frame 2 turns in the horizontal plane with the screw 4. The bearing 23 is supported against the frame by a horizontal connecting arm or element 27 (FIG. 5) in a horizontal plane. The connecting arm 27 is fastened to the frame 2 by a pivoting joint 28. Thus, the connecting element can turn around the horizontal axis of the joint 28 and the bearing 23 can move vertically. Because the force $F_v$ makes the screw 4 bend, the screw is supported in the vertical direction directly against the frame 2 preferably by only one bearing 22 allowing this bending, so that the frame is not subjected to any vertical torsional stresses.

A three-point-pivoting arrangement of the screw 4 would require unreasonable accuracy in the manufacturing process. The supporting track 5 at the silo periphery does not lie accurately enough in the one plane, which is a contributory cause of the vertical movement of the screw. Besides, the screw 4 is not straight enough and, consequently, the drive end of the screw swings. However, the frame 2 has to turn with the screw 4, so that it is necessary to employ the connecting element 27, allowing the movement caused by manufacturing flaws, between the bearing 23 and the frame 2. By using this moving connecting element 27 anid by allowing the vertical movement of the screw, and, furthermore, by making the frame to follow the screw 4, no unreasonable requirements need to be made to the manufacturing process.

Because the cogged wheel 17 and the supporting bearing 22 arc spaced apart and the drive end of the screw moves duo to the bendings caused by the force $F_y$ from the chips, and for the reasons due to the manufacturing accuracy, the distance between the cogged wheel 17 of the screw and the smaller cogged wheel 18 varies. Because of this, the distance between the axes of the cogged wheels 17 and 18 has to be chosen so long that their still is a tooth clearance when the distance between the wheels is at its smallest.

A good continuous tooth contact, considering that the centre distance is variable, is achieved only by placing the smaller cogged wheel 18 in such a way in relation to the bigger cogged wheel 17 that the movement of the wheels in relation to each other, when the wheels are in motion, is parallel with the surface of contact. The cogged wheels rotate according to arrows I and P shown in FIG. 6. When the driven cogged wheel 17 moves vertically according to arrow R and when the pressure angle is 20°, the driving cogged wheel 18 is displaced 20° aside from the directly superposed vertical position in relation to the driven cogged wheel 17. In other words, the straight line connecting the centres of the cogged wheels forms an angle α, which is 20° with the vertical direction. Because the shape of the teeth is evolvent, the contacting surfaces are almost vertical 29, and the pressure line 30, i.e. the common inner tangent of basic circles of the cogged wheels 17, 18, is horizontal. In the arrangement in accordance with the invention, the vertical movement of the cogged wheel 17 of the screw of the turning screw discharger, i.e. the movement R parallel with the contacting surfaces, does not substantially change the contact circumstances of the teeth of the cogged wheels 17, 18 and, consequently, does not increase the abrasion of the teeth.

If the driving wheel 18 is moved for example higher up, so that the axes of the wheels 17 and 18 are at the same level, the contacting surface of the teeth becomes smaller because the vertical movement R of the wheel 17, caused by the swinging of the screw 4, makes the axes have different directions. In consequence thereof, the teeth would wear down in no time.

The movement of the cogged wheel 17 was defined as vertical in the text above. To put it more accurately, the centre axis of the wheel 17 moves, however, along the orbit of a circle whose radius is equal to the distance between its centre axis and the joint 28.

I claim:

1. A screw conveyor, comprising:

a frame part, the frame part being adapted to turn around a vertical turning axis;

a conveyor screw that is adapted to turn with the frame part;

a turning mechanism for turning the apparatus; and a drive for the conveyor screw, the drive including a driving, first, cogged wheel, and a driven, second, cogged wheel, the second cogged wheel being fastened to a shaft of the screw, the second cogged wheel being supported such that it is vertically movable and such that a straight line connecting centers of the first and the second cogged wheel forms an angle with a vertical direction, the angle being equal to a pressure angle of the first and the second cogged wheels.

2. A screw conveyor as defined in claim 1, wherein the straight line connecting the centers of the first and the second cogged wheels forms an angle of 20° with the vertical direction.

3. A screw conveyor as defined in claim 1, wherein the second cogged wheel is fastened to a drive end of the screw and the drive end of the screw is supported against the frame by a supporting bearing supported against the frame by an arm fastened to one side of the bearing, the arm being adapted to turn around a horizontal pivoting axis.

4. A screw conveyor as defined in claim 3, wherein the drive end of the screw is supported from below against the frame by a second bearing allowing the screw to change its direction.

* * * * *